United States Patent
Warmsley et al.

(10) Patent No.: US 11,126,689 B1
(45) Date of Patent: Sep. 21, 2021

(54) AUTOMATED SYSTEM TO IDENTIFY POLARIZED GROUPS ON SOCIAL MEDIA

(71) Applicant: HRL Laboratories, LLC, Malibu, CA (US)

(72) Inventors: Dana Warmsley, Laurelton, NY (US); Jiejun Xu, Chino, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 263 days.

(21) Appl. No.: 16/201,924

(22) Filed: Nov. 27, 2018

Related U.S. Application Data

(60) Provisional application No. 62/621,043, filed on Jan. 24, 2018.

(51) Int. Cl.
*G06F 16/00* (2019.01)
*G06F 17/16* (2006.01)
*G06F 16/9536* (2019.01)
*G06F 16/28* (2019.01)

(52) U.S. Cl.
CPC ............ *G06F 17/16* (2013.01); *G06F 16/285* (2019.01); *G06F 16/9536* (2019.01)

(58) Field of Classification Search
None
See application file for complete search history.

(56) References Cited

U.S. PATENT DOCUMENTS

| | | | | |
|---|---|---|---|---|
| 7,461,073 | B2 * | 12/2008 | Gao | G06K 9/6224 |
| 8,612,169 | B2 * | 12/2013 | Lin | G06F 17/10 |
| | | | | 702/85 |
| 2007/0192350 | A1 * | 8/2007 | Gao | G06K 9/6224 |
| 2011/0320387 | A1 * | 12/2011 | He | G06N 20/00 |
| | | | | 706/12 |
| 2012/0278021 | A1 * | 11/2012 | Lin | G06F 17/10 |
| | | | | 702/85 |
| 2013/0013540 | A1 * | 1/2013 | He | G06N 20/00 |
| | | | | 706/12 |
| 2014/0019118 | A1 * | 1/2014 | Tromp | G06F 40/253 |
| | | | | 704/9 |

(Continued)

OTHER PUBLICATIONS

Unveiling the structure of multi-attributed networks via joint nonnegative matrix factorization, Hung et al., (Year: 2017).*

(Continued)

*Primary Examiner* — Jean M Corrielus
(74) *Attorney, Agent, or Firm* — Tope-McKay & Associates

(57) ABSTRACT

Described is a system for identifying and communicating with polarized groups in social media platforms. The system generates a tripartite graph from online social network data. The tripartite graph incorporates user data, post data, and tag data obtained from the online social network data. Nonnegative matrix factorization is performed on a decomposed tripartite graph to obtain an optimization function. The optimization function is solved to identify polarized groups in the online social network. Based on the identified polarized groups, the system sends pre-determined communications to members of each group aimed at targeted escalation or de-escalation of polarization in an online social media platform.

12 Claims, 16 Drawing Sheets

(56) References Cited

U.S. PATENT DOCUMENTS

| | | | | |
|---|---|---|---|---|
| 2014/0108143 A1* | 4/2014 | Davitz | ............... | G06Q 30/0275 |
| | | | | 705/14.53 |
| 2015/0074020 A1* | 3/2015 | Arpat | ....................... | G06N 5/04 |
| | | | | 706/12 |
| 2017/0076297 A1* | 3/2017 | Dong | ................. | G06Q 30/0201 |

OTHER PUBLICATIONS

Edge Sign Prediction Based on Orthogonal Graph Regularized Nonnegative Matrix Factorization for Transfer Learning, Junwu Yu et al., IEEE (Year: 2019).*

On the Detection of Hate Speech, Hate Speakers and Polarized Groups in Online Social Media, Warmsley, Dana (Year: 2017).*

Community detection in political Twitter networks using Nonnegative Matrix Factorization methods, Ozer et al., IEEE (Year: 2016).*

Unveiling polarization in social networks: A matrix factorization approach, Amin et al., , IEEE (Year: 2017).*

On the Detection of Hate Speech, Hate Speakers and Polarized Groups in Online Social Media, Warmsley Dana (Year: 2018).*

Amin, Md Tanvir Al, et al., Unveiling polarization in social networks: A matrix factorization approach, IEEE INFOCOM 2017—IEEE Conference on Computer Communications, Atlanta, GA, 2017, pp. 1-9.

Conover, Michael, et al., Political Polarization on Twitter. Proceedings of the Fifth International Conference on Weblogs and Social Media—ICWSM, Barcelona, Spain, 2011, pp. 89-96.

Dhillon, Inderjit S, Co-clustering documents and words using bipartite spectral graph partitioning, Proceedings of the Seventh ACM SIGKDD International Conference on Knowledge Discovery and Data Mining (KDD-2001), San Francisco, CA, 2001, pp. 269-274.

Ding, Chris, et al. Orthogonal nonnegative matrix tri-factorizations for clustering, Proceedings of the 12th ACM SIGKDD International Conference on Knowledge Discovery and Data Mining, Philadelphia, PA, 2006, pp. 126-135.

Garimella, Kiran, et al. Quantifying controversy in social media, Proceedings of the 9th ACM International Conference on Web, Search and Data Mining, San Francisco, CA, 2016, pp. 33-42.

Kuhn, Harold W. The Hungarian method for the assignment problem, Naval Research Logistics Quarterly 2 (1955), pp. 83-97.

Lee, Daniel D., and H. Sebastian Seung. "Algorithms for non-negative matrix factorization." Advances in neural information processing systems. 2001, pp. 1-7.

* cited by examiner

| 400 | 402 | 404 |
|---|---|---|
| $A_{up}$ | user x post matrix | m x n |
| $A_{ut}$ | user x tag matrix | m x p |
| $A_{pt}$ | post x tag matrix | n x p |
| $U$ | user x polarity group | m x k |
| $V$ | post x polarity group | n x k |
| $W$ | tag x polarity group | p x k |
| $H_1$ | association matrix | k x k |
| $H_2$ | association matrix | k x k |
| $H_3$ | association matrix | k x k |
| $k$ | Number of clusters (polarity groups) | |

FIG. 4 function [U, V, W, H1, H2, H3] = NMF(Aup, Aut, Apt, k, alpha, beta, rho)
Initialize U, V, W randomly
Initialize $H_1, H_2, H_3$ randomly
while not converge:
  update U
  $$U \leftarrow U .* \frac{A_{up}VH_1^T + A_{ut}WH_2^T + \alpha RU}{UU^T A_{up}VH_1^T + UU^T A_{ut}WH_2^T + \alpha D_R U + U\lambda}$$
  update $H_1$
  $$H \leftarrow H_1 .* \frac{U^T A_{up} V}{U^T U H_1^T V^T V}$$
  update V
  $$V \leftarrow V .* \frac{A_{up}^T U H_1 + A_{pt} W H_3^T}{VV^T A_{up}^T U H_1 + VV^T A_{pt} W H_3^T + V\lambda}$$
  update $H_2$
  $$H_2 \leftarrow H_2 .* \frac{U^T A_{ut} W}{U^T U H_2 W^T W}$$
  update W
  $$W \leftarrow W .* \frac{A_{ut}^T U H_2 + A_{pt}^T V H_3}{WW^T A_{ut}^T U H_2 + WW^T A_{pt}^T V H_3 + W\lambda}$$
  update $H_3$
  $$H_3 \leftarrow H_3 .* \frac{V^T A_{pt} W}{V^T V H_3 W^T W}$$

FIG. 5

Gamergate Results

| Regularization | Bipartite $\alpha = 0$ | Tripartite $\alpha = 0$ | K-means | Spectral |
|---|---|---|---|---|
| Accuracy | 0.6258806451 | 0.7483870968 | 0.6129032225 | 0.5161290032 |
| F1-Score | 0.7542237288 | 0.8040201000 | 0.7600000000 | 0.6636677130 |
| ARI | 0.0280706687 | 0.2830962246 | 0.0 | 0.0247793 |
| AUC | 0.6433333333 | 0.7833333333 | 0.6436842210 | 0.6138596649 |

FIG. 6

World Series Results

| | Bipartite | Tripartite | K-means | Spectral |
|---|---|---|---|---|
| Regularization | $\alpha = 0$ | $\alpha = 0$ | | |
| Accuracy | 0.7757575576 | 0.8060606060 | 0.7636363634 | 0.7333333333 |
| F1-Score | 0.8212556038 | 0.8646628822 | 0.8078881773 | 0.8365019011 |
| ARI | 0.3005647556 | 0.3699645582 | 0.2745507166 | 0.1098814290 |
| AUC | 0.8725735155 | 0.9377282343 | 0.8356498874 | 0.5375657433 |

FIG. 8

FIFA (2 teams) Results

| | Bipartite | Tripartite | K-means | Spectral |
|---|---|---|---|---|
| Regularization | $\alpha = 0$ | $\alpha = 0$ | | |
| Accuracy | 0.6666666667 | 0.8205512821 | 0.6923307692 | 0.7307769231 |
| F1-Score | 0.7903322581 | 0.8793310345 | 0.8613313869 | 0.8032786889 |
| ARI | -0.012632288 | 0.3709934799 | 0.0 | 0.0473391903 |
| AUC | 0.5530770609 | 0.8412132002 | 0.5941124 | 0.6494420161 |

FIG. 10

FIFA (4 teams): AUC Results

| Regularization | Germany $\alpha = 0$ | Argentina $\alpha = 0$ | Brazil $\alpha = 0$ | Netherlands $\alpha = 0$ |
|---|---|---|---|---|
| Bipartite AUC | 0.6359940643 | 0.8013358234 | 0.8178859673 | 0.8656441171 |
| Tripartite AUC | 0.7593305835 | 0.8690057724 | 0.8504460666 | 0.9055521472 |

FIG. 12

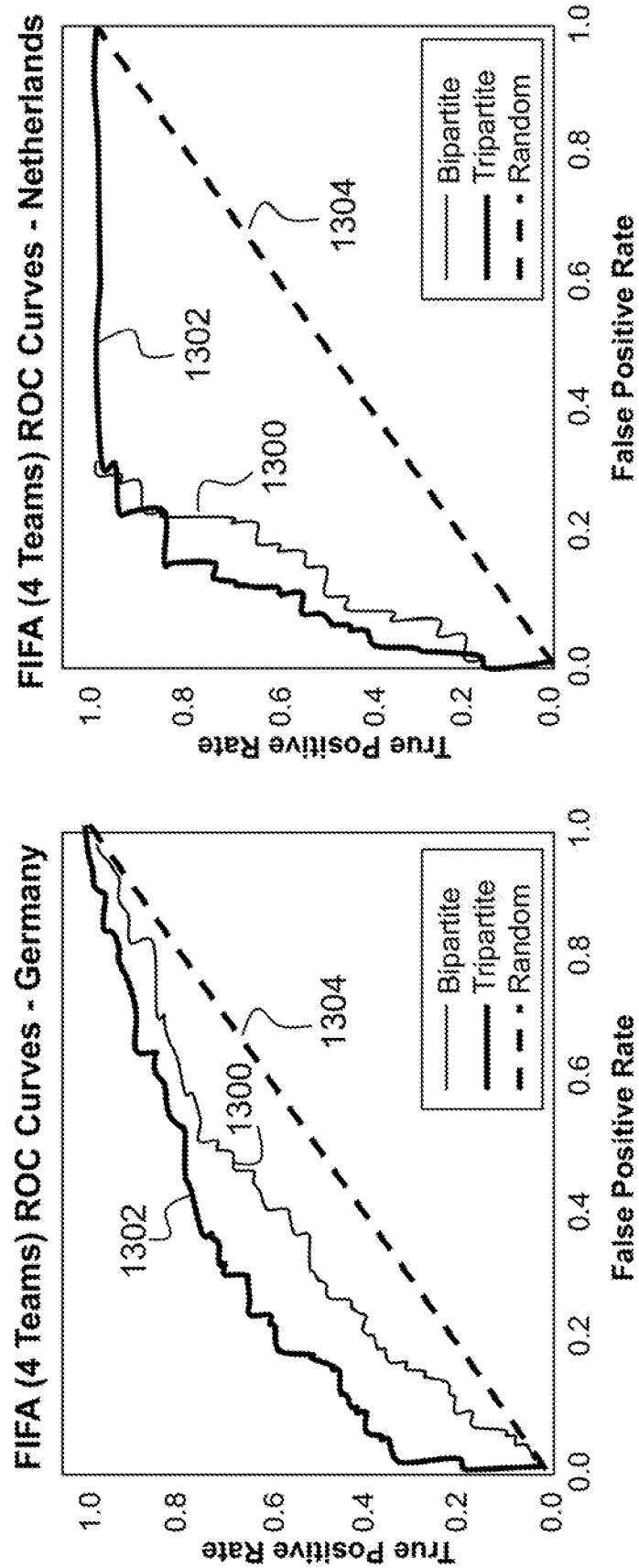

AUTOMATED SYSTEM TO IDENTIFY POLARIZED GROUPS ON SOCIAL MEDIA

CROSS-REFERENCE TO RELATED APPLICATIONS

This is a Non-Provisional Applications of U.S. Provisional Application No. 62/621,043, filed in the United States on Jan. 24, 2018, entitled, "An Automated System to Identify Polarized Groups on Social Media," the entirety of which is incorporated herein by reference.

BACKGROUND OF INVENTION

(1) Field of Invention

The present invention relates to a system for identifying polarization in social media platforms and, more particularly, to a system for identifying polarization in social media platforms using a tripartite network.

(2) Description of Related Art

Previous work in identifying and quantifying polarization in social media, such as political polarization (e.g., belonging to different political parties or groups having different political beliefs), has largely used traditional community detection methods. The results of these methods are often confounded by the existence of neutral users and content. An early approach involved using clustering measures, such as modularity, to identify communities within social networks. Approaches such as this are limited in the context of polarization because the mere existence of communities does not in itself indicate polarization.

A more recent approach has been to collect social media posts referencing a polarizing topic, extract an interaction network from those posts, and, subsequently, apply traditional community detection or clustering methods in order to identify polarized groups. Interaction networks (e.g., retweet networks) tend to be more useful than social networks (e.g., follower networks) because the action of retweeting is a strong indication that the user is interested in the content being shared. Conover et al. (see the List of Incorporated Literature References, Literature Reference No. 2) found that using a label propagation method on retweet graphs of political content uncovered the network's highly partisan structure, effectively separating Twitter users into right- and left-wing clusters.

In testing multiple network polarization quantification measures, Garimella et al. (see Literature Reference No. 5) first used graph partitioning software METIS on retweet graphs to separate networks into polarized groups and later verified that these groups corresponded to the polarized groups they expected. Though they perform well, community detection approaches have some limitations. First, their performance is often confounded by the existence of neutral users and content (see Literature Reference No. 1). Neutral users may share content from multiple polarity groups, just as polarized users may share neutral content (i.e., actions that are not explicitly captured in a retweet network). Further, these methods only take post-related information into account during the stage of data collection by, for example, collecting posts containing relevant keywords or hashtags.

Given a lack of information beyond social network information, traditional community detection approaches often mislabel users into the incorrect polarity groups. An appealing alternative to traditional community detection that allows researchers to deal with neutral networks and incorporate post-related information (even without analyzing the actual text of a post) is nonnegative matrix factorization (NMF). Amin et al. (see Literature Reference No. 1) applied a NMF-based approach in polarization research. The authors performed NMF on a source-assertion (user-post) bipartite network to separately cluster sources and assertions into polarity groups, using a social dependency network as a means of regularization. They showed that NMF can be more effective in identifying polarized groups than community detection approaches, largely due to NMF's ability to uncover latent relationships in network data. However, Amin et al. performed an NMF-based approach on only a user-post, bipartite network.

Thus, a continuing need exists for a polarization detection system having improved performance by incorporating more network information about social media users, their relationships, and the content they post.

SUMMARY OF INVENTION

The present invention relates to a system for identifying polarization in social media platforms and, more particularly, to a system for identifying polarization in social media platforms using a tripartite network. The system comprises one or more processors and a non-transitory computer-readable medium having executable instructions encoded thereon such that when executed, the one or more processors perform multiple operations. The system generates a tripartite graph from online social network data, wherein the tripartite graph incorporates user data, post data, and tag data obtained from the online social network data. Nonnegative matrix factorization (NMF) is performed on a decomposed tripartite graph to minimize an optimization function. The optimization function is solved for identifying polarized groups in the online social network. Based on the identified polarized groups, the system sends pre-determined communications to members of each group aimed at targeted escalation or de-escalation of polarization in an online social media platform.

In another aspect, the tripartite network is separated into a set of bipartite graphs comprising a first bipartite graph of user data and post data, a second bipartite graph of post data and tag data, and a third bipartite graph of user data and tag data.

In another aspect, each bipartite graph has an associated binary adjacency matrix, and in performing NMF on the tripartite graph, the system performs NMF on each of the binary adjacency matrices, and simultaneously performs NMF on each of the bipartite graphs.

In another aspect, in solving the optimization function, the system determines a first difference between a user and post binary adjacency matrix and a product of a user polarity matrix and a post polarity matrix; a second difference between a user and tag binary adjacency matrix and a product of the user polarity matrix and a tag polarity matrix; and a third difference between a post and tag binary adjacency matrix and a product of the post polarity matrix and the tag polarity matrix, and sums the first, second, and third differences.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table illustrating algorithm notations according to some embodiments of the present disclosure;

FIG. 5 is a table illustrating the multiplicative update algorithm used to solve the NMF-based optimization problem according to some embodiments of the present disclosure;

FIG. 6 is a table illustrating that the tripartite method outperforms the bipartite method on accuracy using Gamergate data according to some embodiments of the present disclosure;

FIG. 8 is a table illustrating that the tripartite method outperforms the bipartite method on all measures using World Series data according to some embodiments of the present disclosure;

FIG. 10 is a table illustrating that the tripartite method outperforms the bipartite method on all measures using FIFA (2 teams) data according to some embodiments of the present disclosure;

FIG. 12 is a table illustrating that the tripartite method outperforms the bipartite method in clustering using FIFA (4 teams) data according to some embodiments of the present disclosure;

FIG. 13A is a plot illustrating that the tripartite method outperforms the bipartite method in clustering FIFA Germany team data according to some embodiments of the present disclosure;

FIG. 13B is a plot illustrating that the tripartite method outperforms the bipartite method in clustering FIFA Netherlands team data according to some embodiments of the present disclosure;

DETAILED DESCRIPTION

Figure 1:
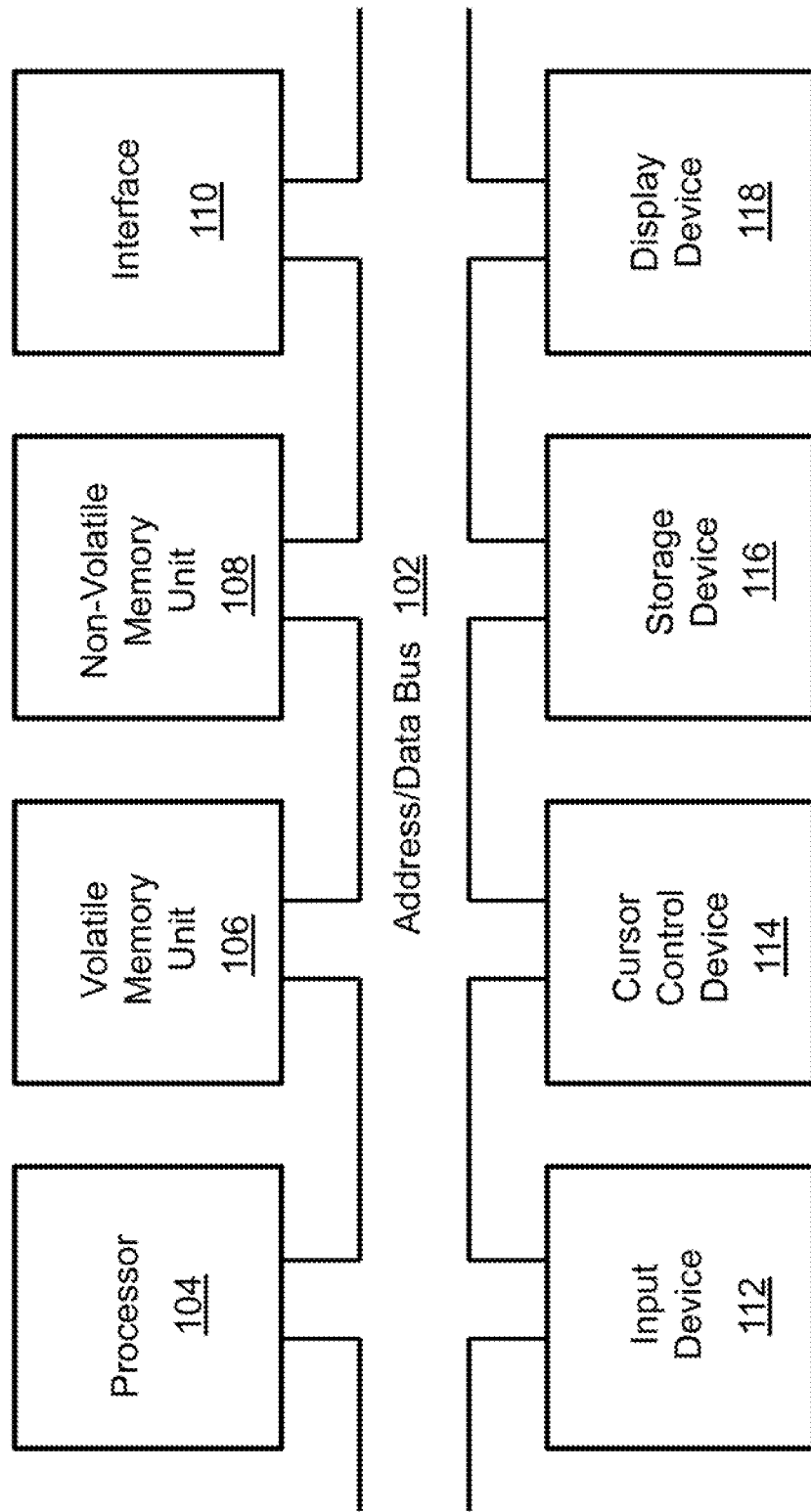
FIG. 1 is a block diagram depicting the components of a system for identifying polarization in social media platforms according to some embodiments of the present disclosure.

The present invention relates to a system for identifying polarization in social media platforms and, more particularly, to a system for identifying polarization in social media platforms using a tripartite network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Amin, Md Tanvir Al, et al., Unveiling polarization in social networks: A matrix factorization approach, IEEE INFOCOM 2017—IEEE Conference on Computer Communications, Atlanta, Ga., 2017, pp. 1-9.
2. Conover, Michael, et al., Political Polarization on Twitter. Proceedings of the Fifth International Conference on Weblogs and Social Media—ICWSM, Barcelona, Spain, 2011, pp. 89-96.
3. Dhillon, Inderjit S, Co-clustering documents and words using bipartite spectral graph partitioning, Proceedings of the Seventh ACM SIGKDD International Conference on Knowledge Discovery and Data Mining (KDD-2001), San Francisco, Calif., 2001, pp. 269-274.
4. Ding, Chris, et al. Orthogonal nonnegative matrix tri-factorizations for clustering, Proceedings of the 12th ACM SIGKDD International Conference on Knowledge Discovery and Data Mining, Philadelphia, Pa., 2006, pp. 126-135.
5. Garimella, Kiran, et al. Quantifying controversy in social media, Proceedings of the 9th ACM International Conference on Web Search and Data Mining, San Francisco, Calif., 2016, pp. 33-42.
6. Kuhn, Harold W. The Hungarian method for the assignment problem, Naval Research Logistics Quarterly 2 (1955) 83-97.
7. Lee, Daniel D., and H. Sebastian Seung. "Algorithms for non-negative matrix factorization." Advances in neural information processing systems. 2001.

(2) Principal Aspects

Various embodiments of the invention include three "principal" aspects. The first is a system for identifying polarization in social media platforms. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
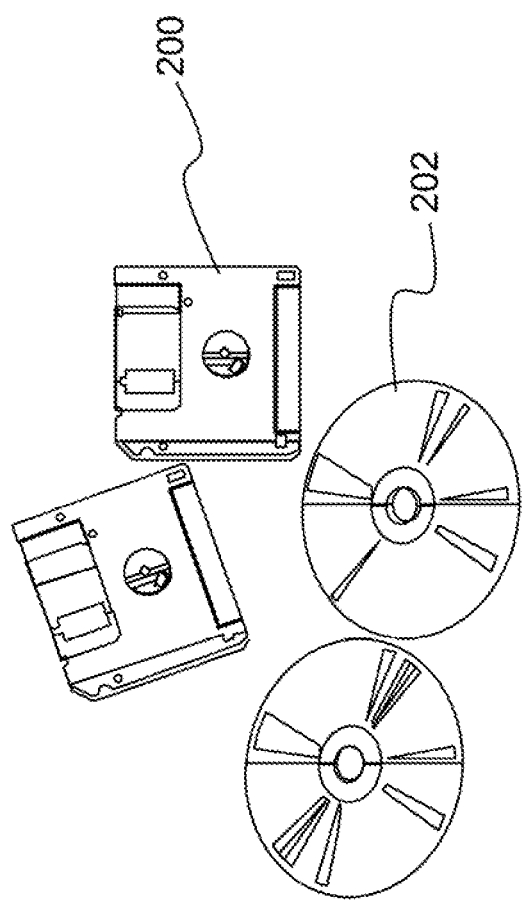
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is an automated system to identify polarized groups in online social networks. Previous work in identifying and quantifying polarization in social media has largely used traditional community detection methods. The results of these methods are often confounded by the existence of neutral users and content, a problem solved by using nonnegative matrix factorization (NMF) to cluster networks. Building upon previous work in the area, the invention described herein includes a NMF-based algorithmic approach for illuminating the polarization patterns of social media's many communities. Unlike community detection and previous NMF-based methods on bipartite networks, in the system according to embodiments of the present disclosure, a NMF is performed on a tripartite user-post-tag network gleaned from social media data. The tripartite network consists of three type of nodes (users, posts, tags) and two types of edges (user-post and post-tag), where an edge exists between a user and post if a user has written or shared that post and an edge exists between a post and tag if a post has been annotated with that tag. Tripartite networks allow the incorporation of more information about users and their social relationships, content and user/content similarity, thereby aiding NMF in discovering latent properties that distinguish polarized groups. Real-world Tumblr™ datasets are used in showing that the algorithm described herein exhibits superior performance in identifying polarization in online communities with respect to a range of real-world events and topics.

The system according to embodiments of the present disclosure performs an automated unsupervised clustering method (nonnegative matrix factorization) on online social network data in order to identify polarized groups. By performing NMF on a tripartite network instead of a bipartite network, as much information about a network as possible is leveraged with little human effort. The work using nonnegative matrix factorization (NMF) is heavily inspired by the need for an approach that works well in multiple contexts: ones varying in the nature of the controversy (e.g., politics vs. sports), the level of polarization, the number of polarity groups involved, and the presence of neutral entities. NMF's ability to uncover latent network properties, coupled with the ease of interpretation of its nonnegative output, makes it an ideal approach for studying these varying types of networks. Further, the approach can be tailored to the amount of information that is available for a given network. NMF can be applied to user post bipartite networks as in previous work, or tripartite user-post-tag networks, as described herein. Incorporating more information, such as which tags have been used to annotate posts, improves clustering performance. Further, though NMF is unsupervised in its normal execution (a major benefit since annotated data is not always available or obtainable), ground truth data can easily be incorporated into the process. Unsupervised methods are methods that do not need any annotated labels or ground truth data. Many researchers working with big data prefer unsupervised methods because of the expense (time, money, human effort) of having data annotated.

Figure 3:
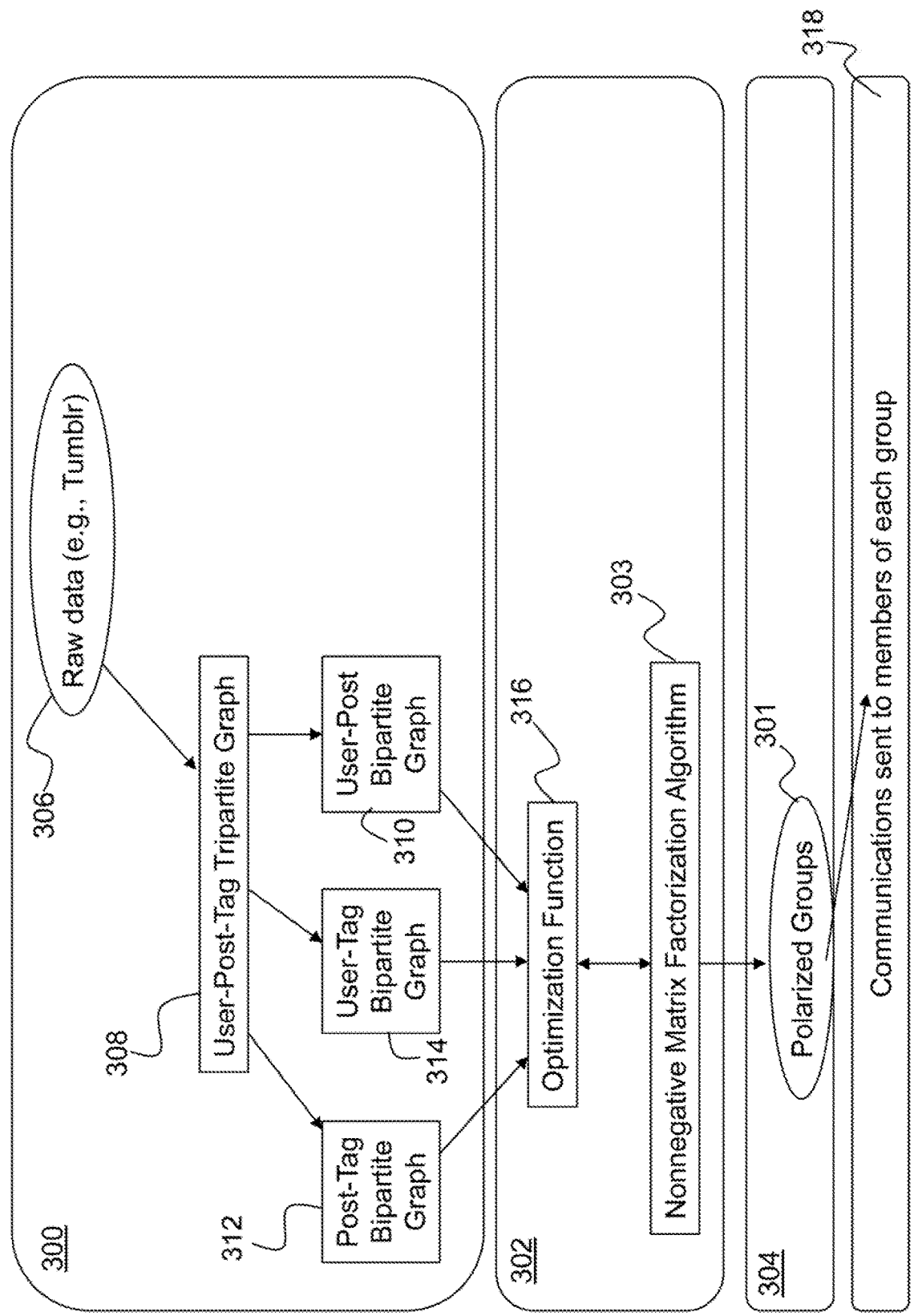
FIG. 3 is a flow diagram illustrating identification of polarized clusters using nonnegative matrix factorization (NMF) according to some embodiments of the present disclosure.

FIG. 3 is a flow diagram illustrating the operations involved in identifying polarized clusters 301 using nonnegative matrix factorization 303 according to embodiments of the present disclosure. The system comprises a pre-processing module 300, an optimization module 302, and an output module 304. In the pre-processing module 300, raw data 306 (e.g. Tumblr data) is used to generate a user-post-tag tripartite graph 308. The user-post-tag tripartite graph 308 can be separated into three informative bipartite graphs, a post-tag bipartite graph 312, a user-tag bipartite graph 314, and a user-post bipartite graph 310. The system seeks to minimize the error associated with each bipartite graph's decomposition into two lower rank matrices that indicate polarity group membership. As such, the errors for each of the three decompositions are combined into one optimization function 316. The NMF algorithm 303 is performed to solve the optimization function 316, finding decompositions that minimize the optimization function. The result of this NMF algorithm 303 is a set of matrices that indicates which cluster (polarized group 301) each user, post, and tag belong to. After finding these polarized groups 301, the system then sends pre-determined communications to members of the appropriate groups (element 318).

(3.1) Preprocessing Module (element 300)

(3.1.1) Preprocessing Step

The identification of polarity groups in social media networks like Tumblr and Twitter is easily characterized as a problem of co-clustering over the tripartite graph user-post-tag (element 308). Notation related to this problem is listed in the table of FIG. 4, which includes a "notation" column 400, a "description" column 402, and a "size" column 404.

In order to extract user, post and tag information for the creation of the tripartite graph, the system first uses a given set of keywords to collect social media posts surrounding a given topic or event of interest. For example, an individual interested in the FIFA games could provide the system with keywords such as "fifa", "fifa2014", "fifa world cup", and "wc2014", while an individual interested in the world series could provide the keyword "world series". The resulting posts found by the system would include tag and user information, allowing for the creation of the tripartite user-post-tag graph. A user-post edge is created if a user shares that post, a user-tag edge is created if a user uses a tag to annotate their posts, and a post-tag edge is created if a post is annotated with a tag.

Figure 14:
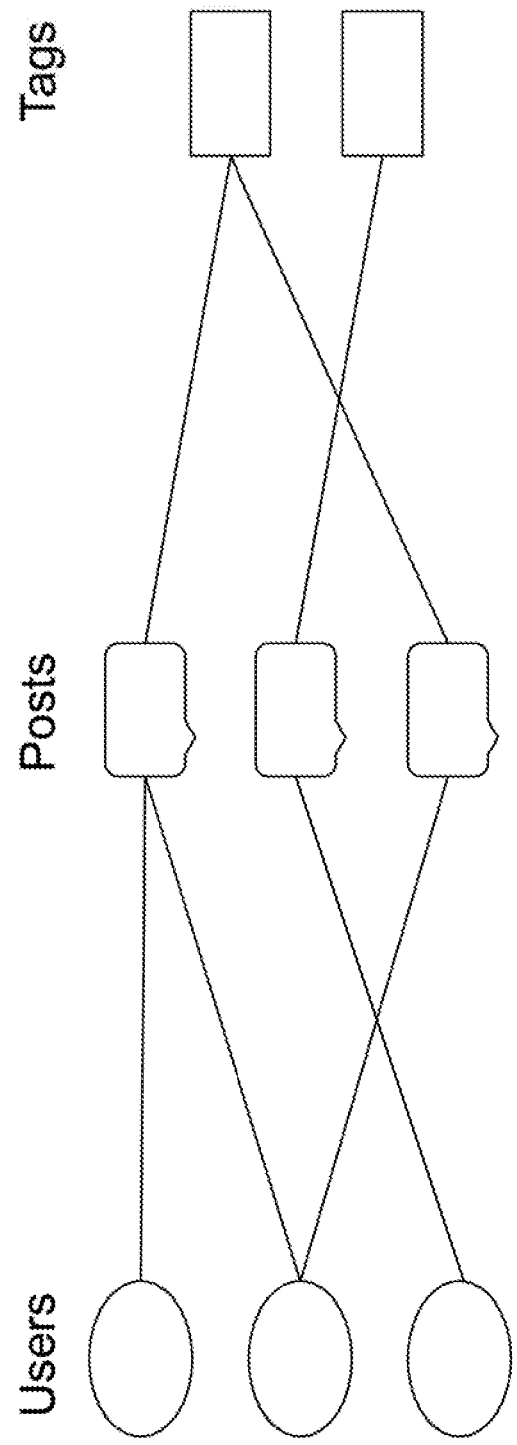
FIG. 14 is an illustration of a tripartite graph according to some embodiments of the present disclosure.
Figure 15:
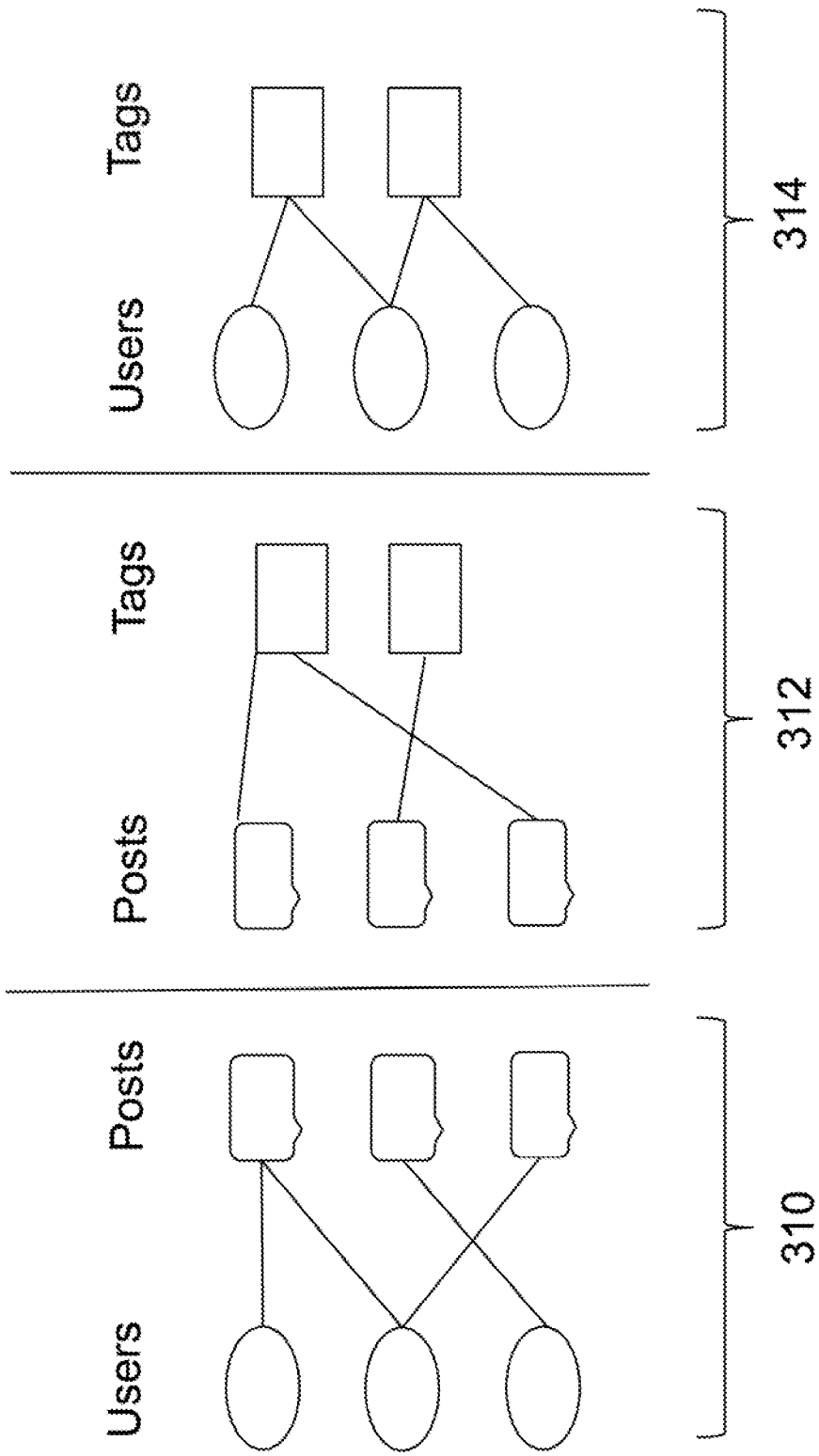
FIG. 15 is an illustration of bipartite graphs according to some embodiments of the present disclosure.

The tripartite graph (element 308, depicted in FIG. 14) can be decomposed into three informative bipartite graphs (shown in FIG. 15), each with a binary adjacency matrix: user-post (Aup) (user-post bipartite graph 310), post-tag (Apt) (post-tag bipartite graph 312), and user-tag (Aut) (user-tag bipartite graph 314). The adjacency matrices are generated as follows: Matrix $A_{up}(i, j)=1$ if user i shared post j, and 0 otherwise. Similarly, $A_{pt}(i, j)=1$ if post i is annotated with tag j by any user, and $A_{ut}(i, j)=1$ if user i annotated at least one of their posts with tag j. Performing NMF on each of these adjacency matrices allows uncovering of latent relationships between its rows and columns. Simultaneously performing NMF on each of the bipartite graphs (elements 310, 312, and 314), as this system does, allows for informing the clustering of one bipartite graph using the intermediate clustering results of another.

(3.2) Optimization Module (Element 302)

(3.2.1) Solving the Optimization Problem: A Multiplicative Update Algorithm

Simultaneously performing non-negative matrix factorization (NMF) on the aforementioned bipartite graphs (elements 310, 312, and 314) can be formulated as an optimization problem, yielding the following optimization function element 316):

$$\min_{U,V,W,H_1,H_2,H_3} \|A_{up} - UH_1V^T\|_F^2 + \|A_{ut} - UH_2W^T\|_F^2 + \|A_{pt} - VH_3W^T\|_{F'}^2,$$
$$\text{s.t. } U^TU = I, V^TV = I, W^TW = I$$

Note that orthogonality constraints are included on U, V, W (where I is the identity matrix, and U, V, W are the user, post, and tag cluster matrices, respectively) in order to ensure simultaneous clustering of the rows and columns of adjacency matrices, resulting in the inclusion of matrices $H_1$, $H_2$, and $H_3$ (see Literature Reference No. 3) that indicate the association between the cluster matrix pairs. Note that each term uses the Frobenius norm, represented by F. In other words, in solving the optimization function, the system determines a first difference between a user-post binary adjacency matrix and a product of a user polarity matrix and a post polarity matrix. The user polarity matrix indicates which polarity group each user belongs to and the post polarity matrix indicates with polarity group each post belongs to. A second difference between a user-tag binary adjacency matrix and a product of the user polarity matrix and a tag polarity matrix is determined, where the tag polarity matrix indicates which polarity group each tag belongs to. The system then determines a third difference between a post-tag binary adjacency matrix and a product of the post polarity matrix and the tag polarity matrix. Finally, the three differences are summed.

The optimization problem 316 is solved using a multiplicative update algorithm (element 303) initially outlined by Lee and Seung (see Literature Reference No. 7), dictated by rules later derived by Ding et. al. (see Literature Reference No. 4). The NMF algorithm (element 303) and multiplicative update rules are presented in the table in FIG. 5. In each iteration of the algorithm, the matrices U, $H_1$, V, $H_2$, W and $H_3$ are updated in sequence using the calculations/update rules presented in FIG. 5. The update rules are designed to decrease the output value of the optimization function in each iteration until the value converges, thereby minimizing the error associated with decomposing the bipartite graphs into cluster matrices after some number of iterations.

(3.3) Output (Element 304)

The NMF algorithm 303 outputs optimized matrices U, V and W, which indicate the polarized group membership for each post, user and tag. Based on this output (element 304) of the identified polarized groups (element 301), the system described herein will automatically send pre-determined communications (element 318) (e.g., via email, via text message) to members of the identified polarized groups (element 301). For example, the system can automatically send "Go vote" emails to the identified members of a pro-democratic party group. The pre-determined communications can be digital content in the form of text, audio, images, video, or any combination thereof.

(3.4) Experiments and Results (3.4.1) Data Collection

To test the invention's applicability to a variety of real-world use cases, topics were deliberately chosen so that they would vary in the nature of the controversy and the number of polarized groups involved. Discussion around politicized topics like gay marriage tends to center around two major groups (liberal, conservative). Similarly, individuals are usually "for" or "against" protests and the event that sparked them. Sports events, such as FIFA, differ in that the number of polarized groups discussing the event will often depend on the number of teams involved in the tournament.

For instance, the World Cup is one of the most prestigious football competitions, occurring every four years. The tournament involves 32 teams globally, though the dataset used starts at the beginning of the quarter finals (Jul. 2, 2014-Jul. 13, 2014). Posts related to FIFA were collected by searching post content and their corresponding tags for the terms 'fifa', 'fifa 2014', 'fifa world cup', 'world cup', 'world cup 2014' and 'wc 2014.' The terms were used to find posts on Tumblr related to FIFA, which is the data collection process used prior to creating graphs.

The World Series is an annual American baseball competition. The tournament involves 2 teams playing for the best of 7 games. Data was collected from Oct. 21, 2014 through Oct. 29, 2014 using the tag 'world series.'

Gamergate was a movement against corrupt gaming journalism. The controversy stemmed from the use of the hashtag Gamergate to conduct a harassment campaign against female gamers. In order to capture online discussion about the event and subsequent protests, data was collected from Aug. 27, 2014 through Sep. 5, 2014. The term used to collect Gamergate-related posts was 'gamer gate'.

For each dataset described above, 50 runs of the following experiments were performed: 1) NMF on the bipartite user post (element 310) and tripartite user-post-tag (element 308) graphs, each without regularization; 2) K-means community detection on bipartite graph user-post (element 310); and 3) Spectral co-clustering on bipartite graph user-post (element 310). Spectral co-clustering was used as a baseline algorithm because it has been successfully applied to many of the same applications (including bipartite document-term clustering) as nonnegative matrix factorization (see Literature Reference No. 3). Polarized groups were then extracted and the results compared to ground truth data. These results are presented below.

(3.4.2) Results
(3.4.2.1) Gamergate

The Gamergate results, presented in the table in FIG. 6 show that NMF on the tripartite graph generates better results than the baseline models (i.e., spectral co-clustering). In particular, a 12% increase in accuracy is seen, a 5% increase in F1-score is seen, and a 25.5% increase in the Adjusted Rand Index (ARI) value is seen. Here, the F1-Score is a measurement of the accuracy of the algorithm's results, and the ARI score is a measure of the similarity between the actual known results and the results of the algorithm (also a measure of accuracy).

Figure 7:
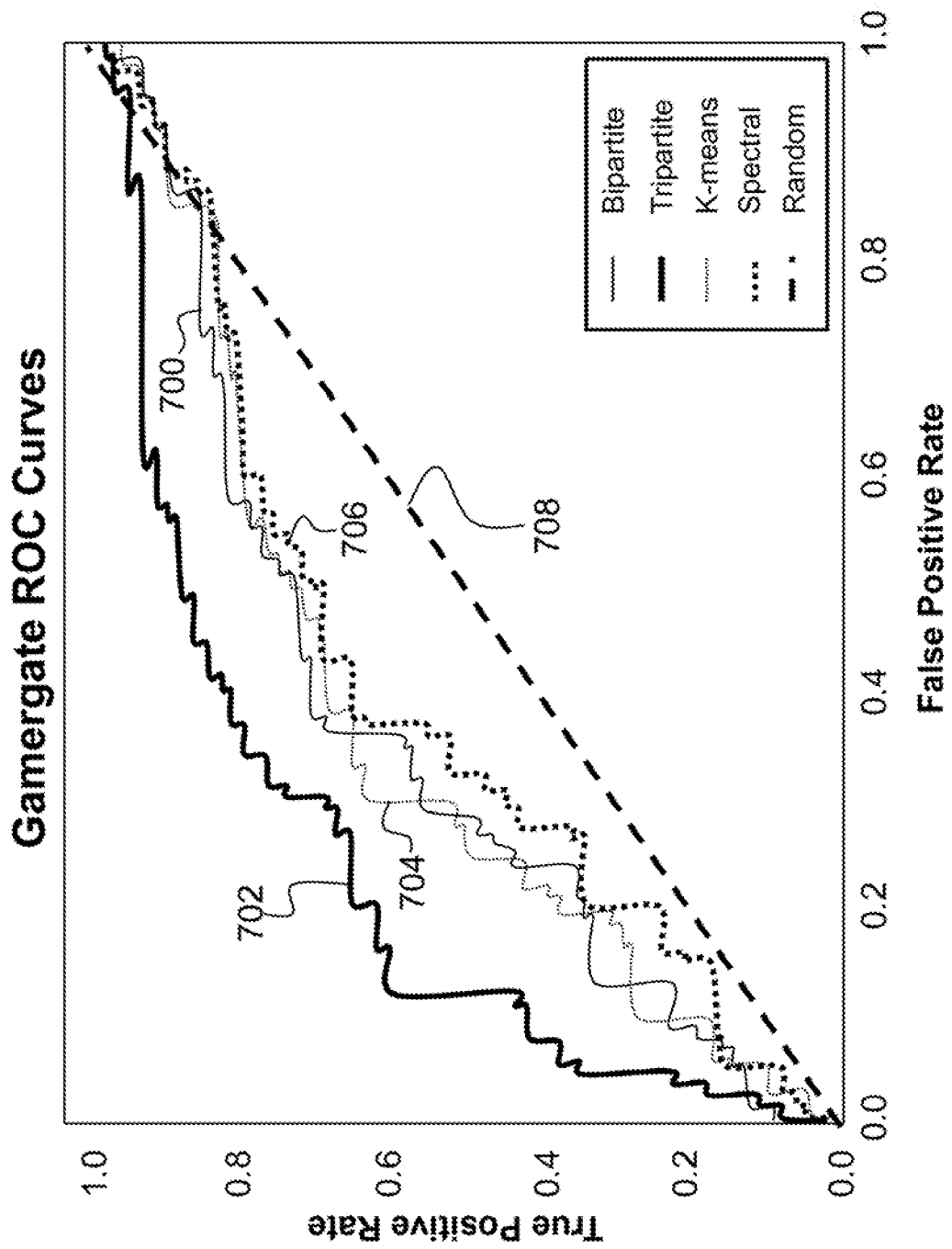
FIG. 7 is a plot illustrating that the tripartite method outperforms the bipartite method on accuracy using Gamergate data according to some embodiments of the present disclosure.

Furthermore, 200 annotated Gamergate posts were used as ground truth in plotting the receiver operating characteristic (ROC) curves presented in FIG. 7, which plots the true positive rate (y-axis) against the false positive rate (x-axis). In FIG. 7, the solid unbolded curve 700 represents NMF on the bipartite graph, the solid bold curve 702 represents NMF on the tripartite graph, the dotted unbolded curve 704 represents K-means community detection, the dotted bold curve 706 represents spectral co-clustering, and the dashed bold line 708 represents the random guess line. Of the 200 annotated posts, 60 posts supported Gamergate and 95 were against it. FIG. 7 shows that NMF on the tripartite graph (element 702) generates better results than the baseline models (i.e., spectral co-clustering 706).

(3.4.2.2) World Series Dataset

Figure 9:
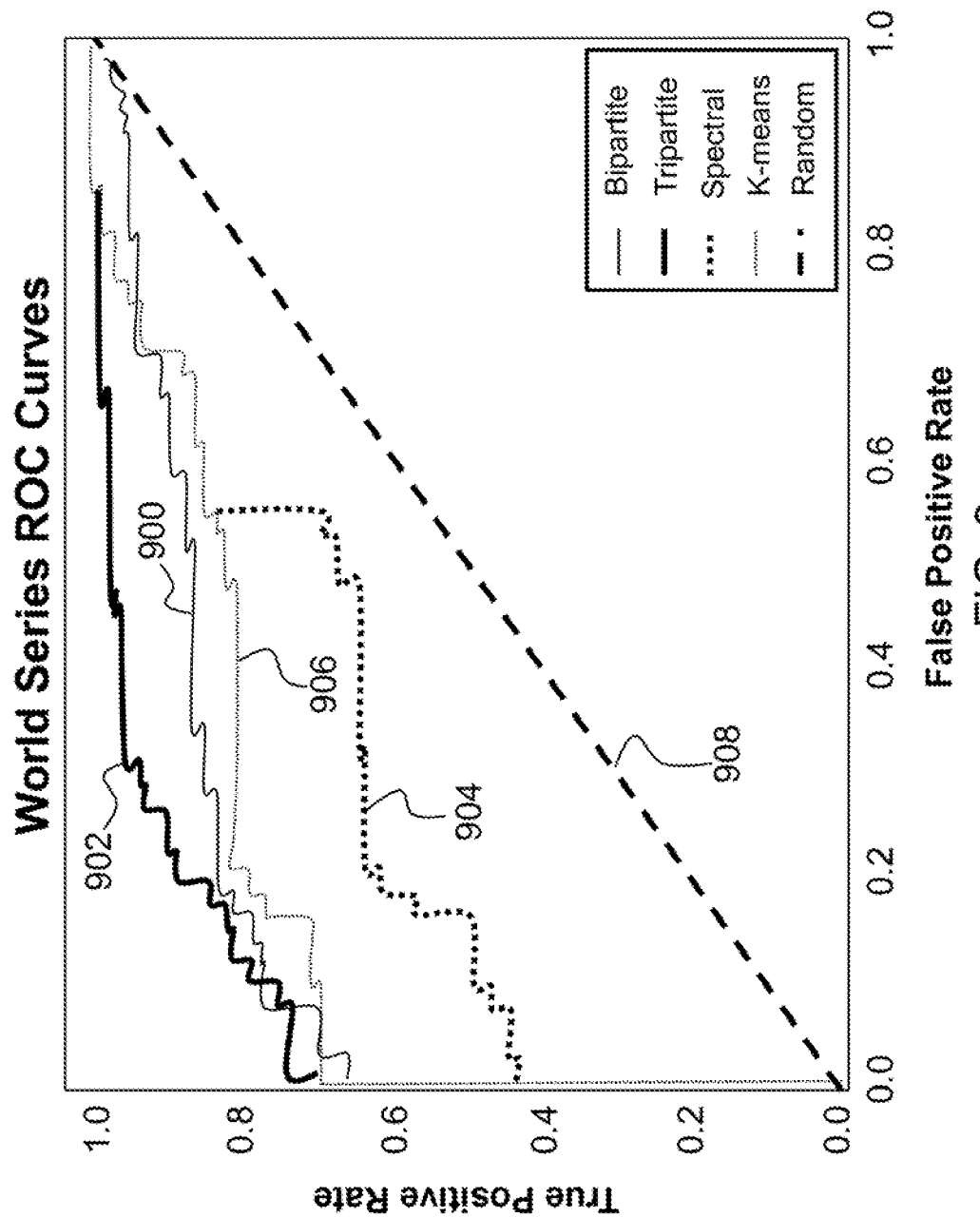
FIG. 9 is a plot illustrating that the tripartite method outperforms the bipartite method on all measures using World Series data according to some embodiments of the present disclosure.

There were 478 posts from the World Series dataset annotated based on the team the post supported. Of the 478 posts, 43 supported the 'Kansas City Royals,' 121 supported the 'San Francisco Giants,' and 314 were 'neutral.' The performance measures for each experiment can be found in the table in FIG. 8. It was found that that applying NMF to a tripartite graph results in approximately a 3% increase in accuracy, 4% increase in F1-score, and 7% increase in the ARI and AUC (area under the curve) values. It should be noted that while the K-means algorithm does appear to rival the tripartite method for certain thresholds (see FIGS. 8 and 9), it does so only by placing most (if not all) of the posts into the same polarity group and, therefore, does not exhibit very much overall predictive power in the context of polarization identification. In FIG. 9, the solid unbolded curve 900 represents NMF on the bipartite graph, the solid bold curve 902 represents NMF on the tripartite graph, the dotted bold curve 904 represents spectral co-clustering, the dotted unbolded curve 906 represents K-means community detection, and the dashed bold line 908 represents the random guess line.

(3.4.2.3) FIFA (2 Teams) Dataset

Figure 11:
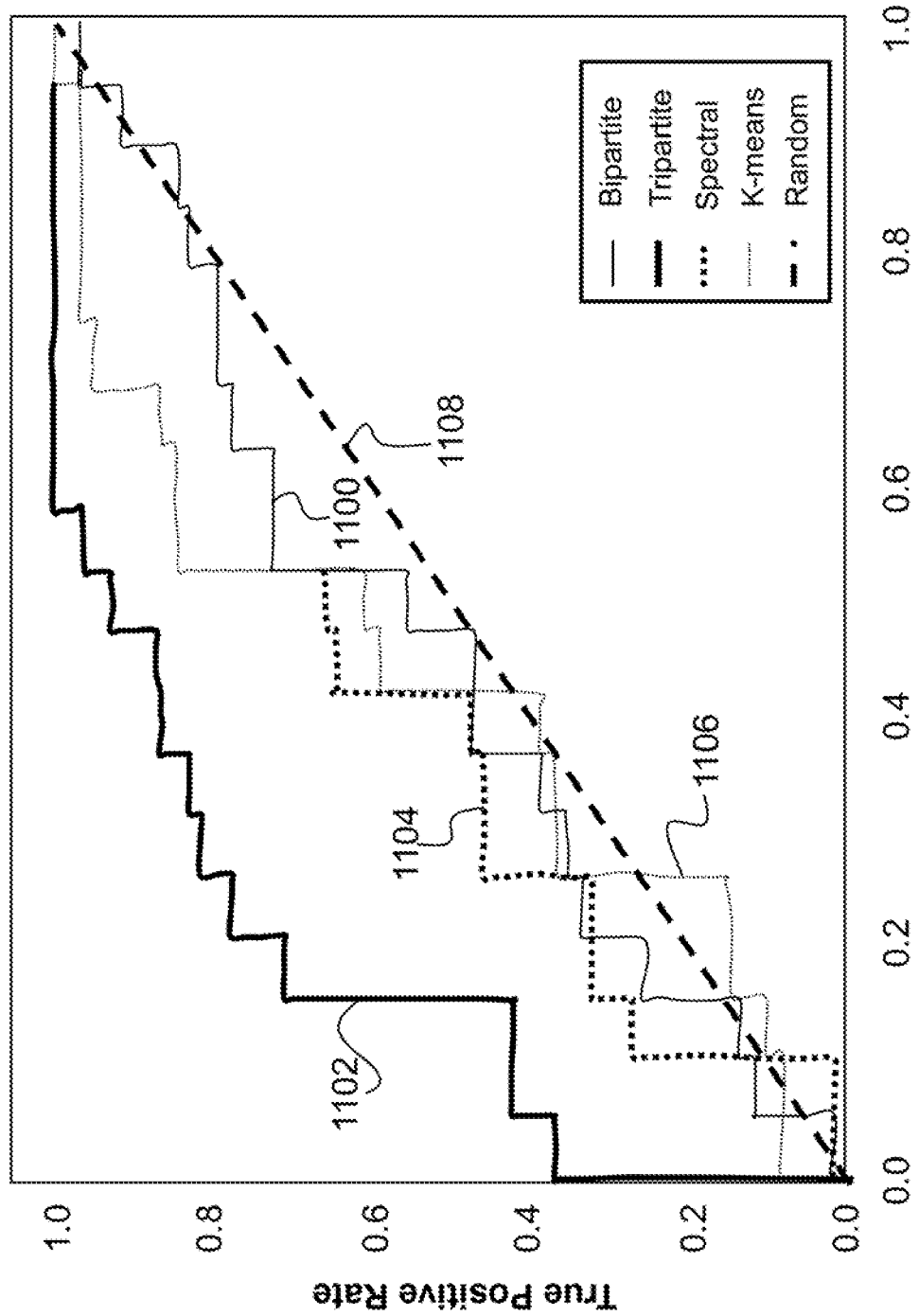
FIG. 11 is a plot illustrating that the tripartite method outperforms the bipartite method on all measures using FIFA (2 teams) data according to some embodiments of the present disclosure.
Figures 13C, 13D:
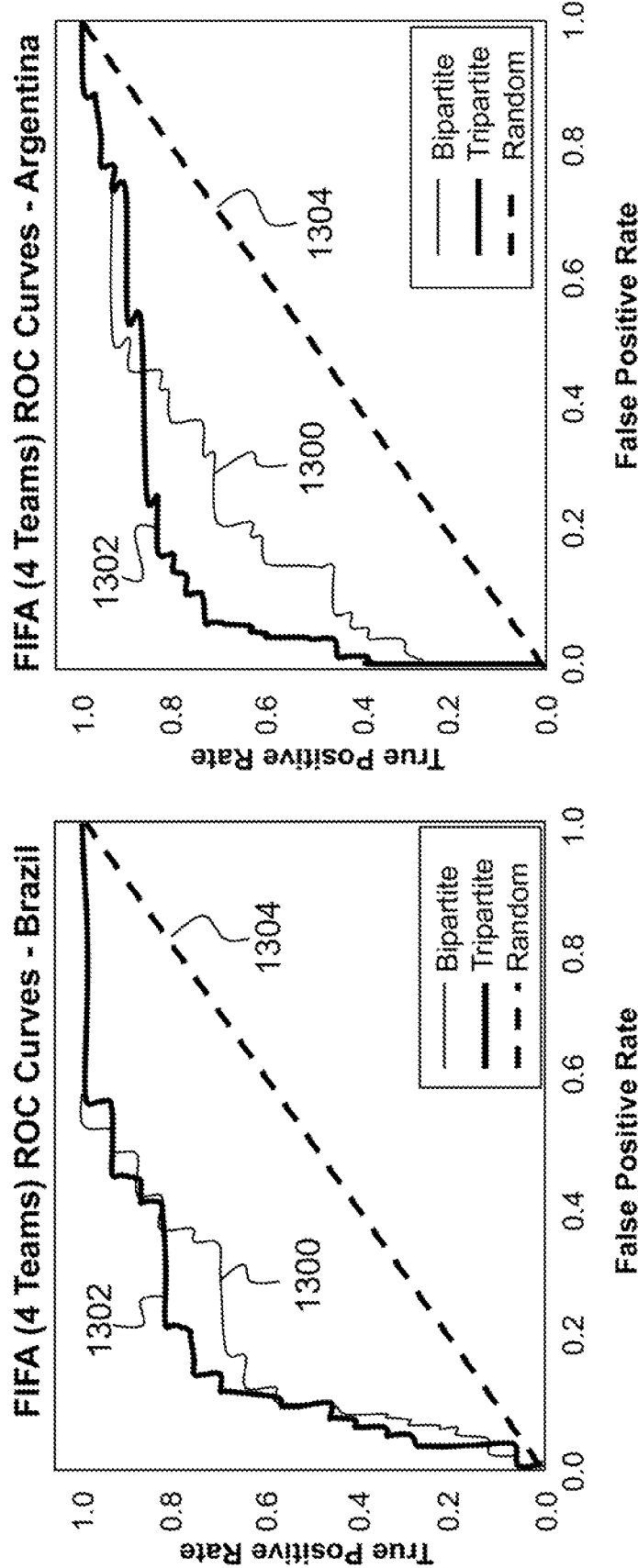
FIG. 13C is a plot illustrating that the tripartite method outperforms the bipartite method in clustering FIFA Brazil team data according to some embodiments of the present disclosure.
FIG. 13D is a plot illustrating that the tripartite method outperforms the bipartite method in clustering FIFA Argentina team data according to some embodiments of the present disclosure.

Of the 592 FIFA posts annotated, the 344 associated with the final match were used as ground truth labels. Of these, 59 posts supported Germany, 19 posts supported Argentina, and the remaining 266 posts were neutral. Performance results in the table in FIG. 10 indicate that the tripartite method according to embodiments of the present disclosure exhibits an approximately 15% increase in accuracy, an 8% increase in F1-score, and a 37% increase in ARI value. Further, the ROC curves in FIG. 11 show a 29% increase in AUC (area under the curve) over the bipartite method, and a 20% increase over its closest competitor, spectral co-clustering. In FIG. 11, the solid unbolded curve 1100 represents NMF on the bipartite graph, the solid bold curve 1102 represents NMF on the tripartite graph, the dotted bold curve 1104 represents spectral co-clustering, the dotted unbolded curve 1106 represents K-means community detection, and the dashed bold line 1108 represents the random guess line.

(3.4.2.4) FIFA (4 Teams) Dataset

FIG. 12 illustrates a table of performance results for the FIFA (4 teams) dataset, which indicate that the tripartite method according to embodiments of the present disclosure outperforms the bipartite method in clustering the four teams (Germany, Netherlands, Brazil, and Argentina). Additionally, for the FIFA (4 teams) dataset, a ROC curve was plotted for the Germany team (FIG. 13A), the Netherlands team (FIG. 13B), the Brazil team (FIG. 13C), and the Argentina team (FIG. 13D) using 592 annotated posts as ground truth. Of those, 131 posts supported Germany, 30 posts supported Argentina, 17 posts supported Brazil, 20 posts supported the Netherlands, and 393 posts were neutral. In order to match predicted clusters to these ground truth clusters for each of the 50 experiments, the Kuhn-Munkres matching algorithm (see Literature Reference No. 6) was executed to find the cluster matching that would achieve maximum profit. In each of the plots of FIGS. 13A-13D, the unbolded solid curve 1300 represents NMF on the bipartite graph, the bold solid curve 1302 represents NMP on the tripartite graph, and the bold dashed line 1304 represents the random guess line. As shown in FIGS. 13A-13D, it was found that the tripartite method described herein outperforms the prior art bipartite method in classifying each of these teams, as determined by the AUC.

Additionally, the F1-scores and ARI scores were averaged over the 4 polarity groups for each method. The tripartite method obtained an F1-score of 0.661202185, improving upon the bipartite method's F1-score of 0.606557377 by approximately 5%. Similarly, the tripartite method according to embodiments of the present disclosure obtained an ARI score of 0.293969905, about 20% higher than the bipartite method's ARI score of 0.092225707.

In summary, the system described herein applies an NMF-based approach to a tripartite network that allows the system to include more information about social media users, their relationships, and the content they post. The relationships between posts and tags are incorporated into the initial user-post framework to obtain the tripartite graph user-post-tag. Tags, often used to annotate posts, can be a useful source of information in the absence of textual content (for example, a post of a photo, gif or video) or when text analysis is infeasible. Tags are not only an indicator of post content, but may even express the sentiment or point-of-view of the post. For example, popular tags during presidential elections such as #NeverTrump and #CrookedHillary were used by people to indicate which presidential candidate they were for or against. As such, understanding how posts are annotated can be beneficial in clustering both posts and users.

Nonnegative matrix factorization has been used previously in identifying polarized groups in online social networks (see Literature Reference No. 1). The authors performed an NMF-based approach on a bipartite network user-post. The method described herein improves upon that performance by incorporating more network information via the tripartite graph user-post-tag. The gain from this extension is vast in comparison to the small amount of additional human and computational effort it requires.

The system and method described herein has applications in product development and advertisement. For instance, the system can be utilized by companies to allow them to identify groups of social media users that like or dislike one of their consumer products, identify their target audiences, target advertising toward specific polarity groups, and alter consumer products based on polarity group information. Upon identification of polarized groups with respect to a product, companies could target users that may dislike their product with appropriate advertisement efforts. They could also monitor the discussions of users that dislike the product in order to identify improvements that can be made in order to make their product more popular.

The ability to identify polarized groups in online social media can be useful in a wide range of real-world applications, including targeted business advertising, election prediction, and opinion and influence maximization. With the identification of and collection of information about polarized groups, one can proceed with the (de-)escalation of polarization depending on the given context. For example, a sports tournament may want to increase polarization (escalation) surrounding the tournament in order to make it more exciting and competitive. For instance, targeted messaging (e.g., video, audio, images, textual messages) in an online social media platform for escalation of polarization can include teasing/trash-talking comments regarding the opposing team and its fans. In contrast, a political campaign may want to decrease polarization (de-escalation) between their supporters and opponents. For example, targeted messaging for de-escalation of polarization for a political campaign can include sentiments and comments that reflect a middle ground between opposing political parties and/or beliefs, such as with respect to economics, social entitlements, gun control, immigration, healthcare, and environmental policy. Targeting messaging includes the automatic transmittal of digital content (e.g., emails, text messages) to a target group (i.e., members of identified polarized group), which can include multi-media content including text, images, video, and/or audio content.

The ability to identify polarized political groups is especially useful for political campaigns and election prediction. A politician, for example, may collect user, post, and tag information surrounding discussions of their political campaign from social media and use the invention described herein to identify polarized groups (e.g., supporters, opponents) of the campaign. Once identified, the campaign can observe the discussions had by each group in order to develop targeted advertising for each group. Advertising geared toward supporters will focus on retaining their support, while advertisements geared toward opponents will focus on swaying their opinions to a favorable one. Similarly, for election prediction, one can use the system according to embodiments of the present disclosure to gain an overall idea of who social media users will vote for by collecting user, post, and tag information related to discussions around the election and performing NMF on the resulting tripartite graph. Each polarized group of users found by the invention will represent a different constituency.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identifying and communicating with polarized groups in social media platforms, the system comprising:
   one or more processors and a non-transitory computer-readable medium having executable instructions encoded thereon such that when executed, the one or more processors perform operations of:
   generating a tripartite graph from online social network data, wherein the tripartite graph incorporates user data, post data, and tag data obtained from the online social network data;
   separating the tripartite graph into three bipartite graphs;
   decomposing each bipartite graph into a matrix that indicates polarity group membership, wherein an error is associated with decomposition of each bipartite graph;
   combining the errors from the decompositions into an optimization function;
   performing nonnegative matrix factorization (NMF) to solve the optimization function and find decompositions that minimize the optimization function;
   outputting optimized matrices which identify polarized groups in the online social network; and
   based on the identified polarized groups, sending predetermined communications to members of each group aimed at targeted escalation or de-escalation of polarization in an online social media platform.

2. The system as set forth in claim 1, wherein the three bipartite graphs comprise a first bipartite graph of user data and post data, a second bipartite graph of post data and tag data, and a third bipartite graph of user data and tag data.

3. The system as set forth in claim 1, wherein each bipartite graph is decomposed into a binary adjacency matrix,
   performing NMF on each binary adjacency matrix; and
   simultaneously performing NMF on each bipartite graph.

4. The system as set forth in claim 3, where in solving the optimization function, the one or more processors further perform operations of:
   determining a first difference between a user and post binary adjacency matrix and a product of a user polarity matrix and a post polarity matrix;
   determining a second difference between a user and tag binary adjacency matrix and a product of the user polarity group and a tag polarity matrix;
   determining a third difference between a post and tag binary adjacency matrix and a product of the post polarity group and the tag polarity group; and
   summing the first, second, and third differences.

5. A computer implemented method for identifying and communicating with polarized groups in social media platforms, the method comprising an act of:
  causing one or more processers to execute instructions encoded on a non-transitory computer-readable medium, such that upon execution, the one or more processors perform operations of:
  separating the tripartite graph into three bipartite graphs;
  decomposing each bipartite graph into a matrix that indicates polarity group membership, wherein an error is associated with decomposition of each bipartite graph;
  combining the errors from the decompositions into an optimization function;
  performing nonnegative matrix factorization (NMF) to solve the optimization function and find decompositions that minimize the optimization function;
  outputting optimized matrices which identify polarized groups in the online social network; and
  based on the identified polarized groups, sending predetermined communications to members of each group aimed at targeted escalation or de-escalation of polarization in an online social media platform.

6. The method as set forth in claim 5, wherein the three bipartite graphs comprise a first bipartite graph of user data and post data, a second bipartite graph of post data and tag data, and a third bipartite graph of user data and tag data.

7. The method as set forth in claim 5, wherein each bipartite graph is decomposed into a binary adjacency matrix,
  performing NMF on each binary adjacency matrix; and
  simultaneously performing NMF on each bipartite graph.

8. The method as set forth in claim 7, where in solving the optimization function, the one or more processors further perform operations of:
  determining a first difference between a user and post binary adjacency matrix and a product of a user polarity matrix and a post polarity matrix;
  determining a second difference between a user and tag binary adjacency matrix and a product of the user polarity group and a tag polarity matrix;
  determining a third difference between a post and tag binary adjacency matrix and a product of the post polarity group and the tag polarity group; and
  summing the first, second, and third differences.

9. A computer program product for identifying and communicating with polarized groups in social media platforms, the computer program product comprising:
  computer-readable instructions stored on a non-transitory computer-readable medium that are executable by a computer having one or more processors for causing the processor to perform operations of:
  separating the tripartite graph into three bipartite graphs;
  decomposing each bipartite graph into a matrix that indicates polarity group membership, wherein an error is associated with decomposition of each bipartite graph;
  combining the errors from the decompositions into an optimization function;
  performing nonnegative matrix factorization (NMF) to solve the optimization function and find decompositions that minimize the optimization function;
  outputting optimized matrices which identify polarized groups in the online social network; and
  based on the identified polarized groups, sending predetermined communications to members of each group aimed at targeted escalation or de-escalation of polarization in an online social media platform.

10. The computer program product as set forth in claim 9, wherein the three bipartite graphs comprise a first bipartite graph of user data and post data, a second bipartite graph of post data and tag data, and a third bipartite graph of user data and tag data.

11. The computer program product as set forth in claim 9, wherein each bipartite graph is decomposed into a binary adjacency matrix,
  performing NMF on each binary adjacency matrix; and
  simultaneously performing NMF on each bipartite graph.

12. The computer program product as set forth in claim 11, where in solving the optimization function, the one or more processors further perform operations of:
  determining a first difference between a user and post binary adjacency matrix and a product of a user polarity matrix and a post polarity matrix;
  determining a second difference between a user and tag binary adjacency matrix and a product of the user polarity group and a tag polarity matrix;
  determining a third difference between a post and tag binary adjacency matrix and a product of the post polarity group and the tag polarity group; and
  summing the first, second, and third differences.

* * * * *